Figure 1:
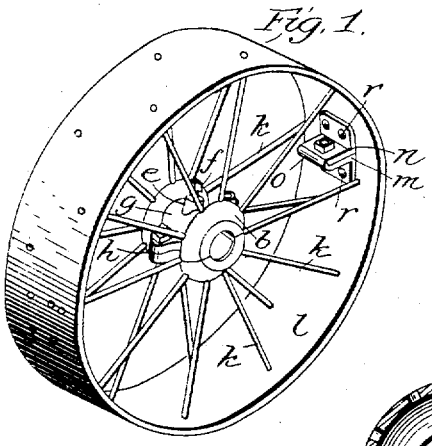
Figure 1:
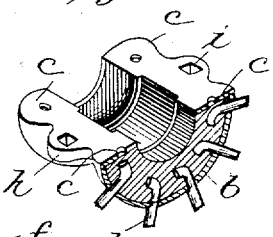
Figure 1:
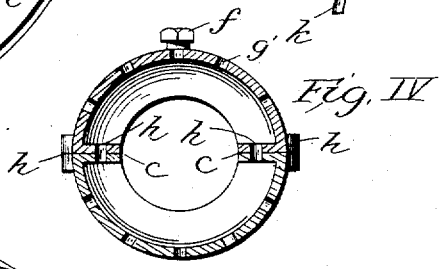
Figure 1:
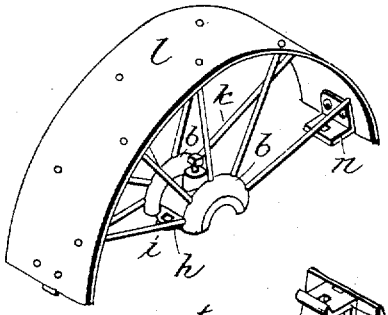
Figure 1:
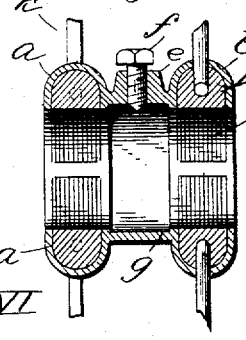
Figure 1:
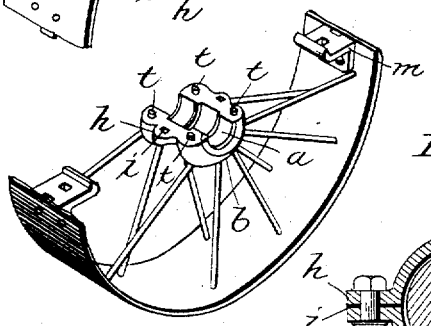
Figure 1:
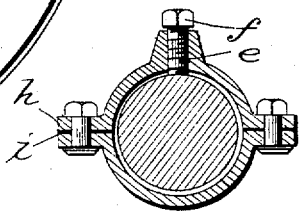
Figure 1:
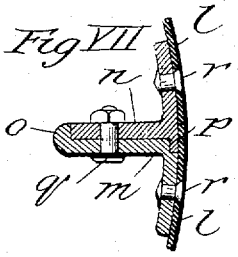
Figure 1:
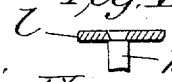
Figure 1:
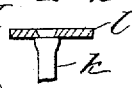

Examiner's Room.

[redacted] English patents 14,376 and 9437 of 1834.

2 Sheets—Sheet 1.

5

L. J. CRECELIUS.

WHEEL.

No. 11,342. Reissued May 30, 1893.

Fig. III

Fig. VII

Fig. VIII

Fig. IX

Attest

Walter Malcom

F. L. Middleton

Inventor

Louis J. Crecelius by Elis Spear

Atty

THE NORRIS PETERS CO., PHOTO-LITHO., WASHINGTON, D. C.

64-10-2

74. MACHINE ELEMENTS
AND MECHANISMS
22712
2 Sheets—Sheet 2.
L. J. CRECELIUS.
WHEEL.
No. 11,342. Reissued May 30, 1893.
Fig. X
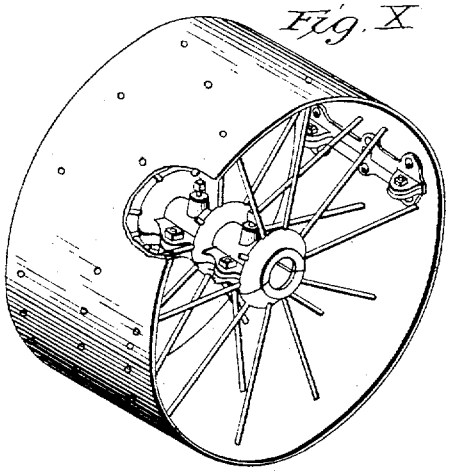
Fig. XI
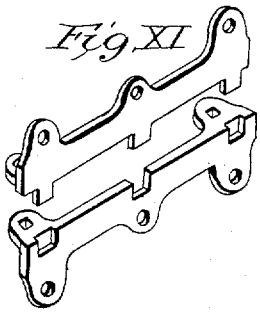
Fig. XIV
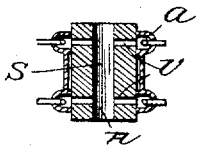
Fig. XIII
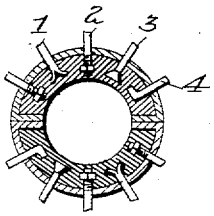
Fig. XII
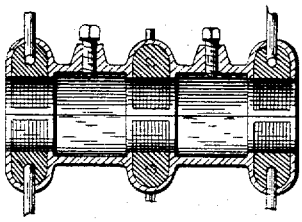
Attest
Malern Haldeman
F. L. Middleton
Inventor
Louis J. Crecelius
by Elis Spear
Atty.

UNITED STATES PATENT OFFICE.

LOUIS J. CRECELIUS, OF ST. LOUIS, MISSOURI, ASSIGNOR OF ONE-HALF TO CHARLES E. PEARCE, OF SAME PLACE.

WHEEL.

SPECIFICATION forming part of Reissued Letters Patent No. 11,342, dated May 30, 1893.

Original No. 473,728, dated April 26, 1892. Application for reissue filed April 17, 1893. Serial No. 470,797.

*To all whom it may concern:*

Be it known that I, LOUIS J. CRECELIUS, a citizen of the United States of America, residing at St. Louis, in the State of Missouri, have invented certain new and useful Improvements in Wheels, of which the following is a specification.

My invention relates to wheels adapted to be used for the transmission of power or to support portable machines or vehicles; and it relates to a form of wheel in which the hub is composed of a shell, in the cavities of which projecting ends of the spokes are embedded in fusible or plastic material contained and hardened in said cavities. Such a wheel is shown in my Patent No. 406,705, granted by the United States Patent Office on the 9th day of July, 1889.

My invention consists of a divided or sectional wheel of the kind above indicated and in which is a divided hub composed of parts containing cavities adapted to hold the material in which the spokes are embedded.

My invention consists also in an improved method of putting up wheels of the class described herein.

My said invention is shown in the accompanying drawings, in which—

Figure I, represents in perspective the complete wheel. Fig. II, shows the wheel composed of two parts, said parts being shown in perspective as separated from each other. Fig. III, shows one-half of the hub in perspective with one end partially removed to show the ends of the spokes embedded in the filling. Figs. IV, V and VI show sections of the hub. Fig. VII is a section of the rim of the wheel and of the coupling. Figs. VIII and IX, show sections of the rim, also ends of the spokes fixed to the rim. Fig. X, shows a perspective view of the wheel having three spoke-chambers in the hub. Fig. XI, shows another form of rim-clamp especially adapted to a broad wheel. Fig. XII, is a longitudinal section of the hub of Fig. X. Fig. XIII, is a transverse section of the hub, showing the different forms of enlarged ends of the spokes embedded in the filling of the shells, these different forms of enlarged ends being adapted to be used in the same hub, as shown, or separately. Fig. XIV, illustrates the method of filling the hubs.

In the drawings the wheel is represented as divided into two parts, each part, as illustrated in Fig. II, being formed complete in itself and adapted to be bolted to its fellow to form a complete wheel. The half-hub (shown more clearly in Fig. III) is formed with cavities *a*, fitted to receive and hold the fusible or plastic material in which, when hardened, the ends of the spokes are embedded. The half of the hub shown in Fig. III, has two of such cavities included in the shell *b* (which forms the peripheries of the hub about the cavity) and the partition-shell *c*, which is in the plane radial to the axis of the hub. These cavities or chambers are at the ends of the hub, as shown more clearly in Fig. V, which is a section in a plane at right angles with the plane of the divisional shells or walls *c*, as shown in Figs. III and V. The chambers or cavities are closed at the ends of the hub and are open only to the interior, the interior opening being bounded by the walls, which have semi-circular edges fitted to bear upon a cylindrical shaft or journal. The ends of the cavities of the section are closed by the walls *c*, and the cavity is wholly closed when the section is placed upon a cylindrical shaft or journal.

A semi-cylindrical part of the shell *g* forms the middle part of the hub connecting the two chambered parts and upon one side is a boss *e*, formed to receive a set-screw *f*, by which the hub may be fixed upon the shaft. The shell or wall *b* at the peripheries of the chambers is provided with holes *g'*, in which the spokes are inserted. The divisional plates are extended at the middle part thereof to form ears *h*, in which are holes *i*, adapted to receive the ordinary square bolts, by means of which the two parts are connected together, as shown clearly in Figs. I and VI.

The spokes are shown at *k* and the rim at *l*. The sections of the rim are provided with clamps, by means of which they are held securely together. These clamps are shown more clearly in Figs. I and VII, the latter figure showing more clearly the form which I prefer. The clamping part *m*, has at its outer end a flange *o* and at the angle a recess *p*, it thus being fitted to receive the bar *n*, which is formed with a tongue fitted to the recess *p*. The general form of the clamp in cross-section is that of an ordinary angle-iron. These parts are each bolted at the abutting edge of its respective rim part, so that when the inwardly-projecting parts of the clamp are brought together by the bolt the edges of the rim parts meet and are held securely in place, the parts of the clamp being held to the rim parts by the rivets *r*. The outer ends of the spokes are held in the rim in the manner shown in Figs. VIII and IX. The end of the spoke may be reduced, as shown in Fig. VIII, or upset, as shown in Fig. IX, so as to fit the hole in the rim. It is made to project slightly through and to be upset, the hole being made flaring outward as shown in the figure. One part of the hub is provided on the plane face of the divisional walls *c* with studs *t*, which fit into corresponding holes in the opposing faces of the other part, and thus secure accurately the parts in place. The tongue upon the clamp-iron on the rim fitting in the recess *p* performs the same function for the rim. For wider rims the rim-clamps may be made in the form clearly shown in Fig. XI, in which there are three recesses and three tongues and an increased number of holes for securing the clamp to the rim.

In order to give more secure hold to the inner ends of the spokes, I have formed them with enlarged inner ends. This enlargement may be made by splitting the inner ends and turning the parts outwardly, as shown at the spoke 1, in Fig. XIII, or by putting a nut upon the threaded end of the spoke, as shown at 2, or by upsetting the spoke, as shown at 3, or by bending the end at right angles, as shown at 4. As the spokes may be introduced from the inner side before the parts of the hub are fastened together, enlargements may be used upon the inner ends of the spokes with this construction of hub.

My improved wheel is put together in the manner hereinafter described. The parts of the hub are first bolted together and then bored out to the desired size. Holes are punched or drilled in the periphery or outside shell fitted to the spokes. The hub is taken apart and the spokes inserted and riveted to the rim, so that the two halves of the wheel are complete in themselves, lacking only to be put together and put into proper shape with the filling for the hollow hub. Then the parts with the clamps attached are put together by means above described and put upon a machine, which forces the rim into a circular form.

This machine is provided with a central mandrel, on which the hub is placed in perfectly true position. The mandrel is made hollow with lateral ports leading into the different spoke-chambers, as shown in Fig. XIV, where R is the mandrel and V are the holes leading from the bore S into the chambers *a* of the hub. The ends of the spokes having free play in the chambers will move in or out as the rim is rounded. When the rim is fully compressed and shaped and while it is so held, the metal or other suitable material for filling the chambers is inserted through the hollow mandrel, (preferably under pressure,) and it surrounds and fixes the ends of the spokes in place and when hardened holds them securely. The wheel may be removed from the mandrel by turning it so as to break the connections between the holes V and the chambers. This leaves the bearing perfect, the chambers being in such shape as heretofore described. While the mandrel is in place the holes are perfectly closed, excepting the holes in the mandrel through which the material is forced. The wheel is thus produced in exactly circular form. The construction is such that the wheel is light, strong and cheap.

I have shown the wheel made in two parts, but do not limit myself as to the number of parts. The rim may be made of any suitable material, such as metal, wood or pulp.

I claim as my invention—

1. A hub composed of parts, each part having a chamber opening toward the interior or axis of the hub, formed by the peripheral shell and end walls and having also divisional walls which lie in planes radial to the axis of the hub, the end walls having openings with the edges fitted to the shaft or journal, the inner edges of the divisional walls being also fitted to bear upon the said shaft or journal, the said hub parts being provided also, with holes for spokes and being fitted to receive and combined with a fusible filling adapted to harden within the shell, substantially as described.

2. The method hereinbefore described of putting up a sectional wheel having chambered hub, the same consisting in inserting the spokes through peripheries in the chambers of the hubs and fastening the outer ends of the spokes to the rim-sections, then putting the sections together while the inner ends of the spokes are loose, forcing the wheel by pressure upon the periphery into proper circular shape, and then forcing or pouring the filling material into the chambers about the inner ends of the spokes, all substantially as described.

3. The method hereinbefore described of putting up a wheel having a chambered hub, the same consisting in inserting the spokes through the periphery of the hub, and causing their ends to extend into the chamber in the hub, then fastening the outer ends of said spokes in the rim of the wheel, then, while the inner ends of the spokes are loose in the hub, forcing the wheel into proper shape, and, while it is held in such shape, pouring the filling material into the chamber and around the inner ends of the spokes, substantially as described.

In testimony whereof I affix my signature in presence of two witnesses.

LOUIS J. CRECELIUS.

Witnesses:
A. BORLINGHAUS,
CHARLES PICKLES.